(12) United States Patent
Omura

(10) Patent No.: US 11,553,702 B2
(45) Date of Patent: Jan. 17, 2023

(54) FISHING LINE THREADER

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 81 days.

(21) Appl. No.: 17/081,011

(22) Filed: Oct. 27, 2020

(65) Prior Publication Data
US 2021/0137088 A1 May 13, 2021

(30) Foreign Application Priority Data

Nov. 8, 2019 (KR) .......................... 10-2019-0142374
Apr. 17, 2020 (KR) .......................... 10-2020-0046448

(51) Int. Cl.
*A01K 91/03* (2006.01)
*A01K 87/04* (2006.01)

(52) U.S. Cl.
CPC .............. *A01K 91/03* (2013.01); *A01K 87/04* (2013.01)

(58) Field of Classification Search
CPC ...... A01K 87/04; A01K 87/005; A01K 91/03; A01K 97/00; A01K 99/00; A01K 91/04; D05B 87/00
USPC ....................................................... 43/44.98
See application file for complete search history.

(56) References Cited

U.S. PATENT DOCUMENTS

| 2,042,403 | A | * | 5/1936 | Hrivnak | ................. D05B 87/00 223/99 |
| 2,167,080 | A | * | 7/1939 | Mason | ................... D05B 87/00 223/99 |
| 2,567,408 | A | * | 9/1951 | Gustav | ................... D05B 87/00 223/99 |
| 2,981,029 | A | * | 4/1961 | Markoff-Moghadam | ................... A01K 91/03 24/131 R |

(Continued)

FOREIGN PATENT DOCUMENTS

| CN | 101022722 A | 8/2007 |
| CN | 204949199 U | 1/2016 |

(Continued)

OTHER PUBLICATIONS

Chinese Office Action issued in Chinese Patent Apoiication No. 202011228340.1 dated May 9. 2022, (w/ English translatlon).

*Primary Examiner* — Christopher P Ellis
(74) *Attorney, Agent, or Firm* — Oblon, McClelland, Maier & Neustadt, L.L.P.

(57) ABSTRACT

A fishing line threader passes a fishing line through guide rings of fishing line guides installed in a fishing rod. The fishing line threader is composed of a single metallic wire material and has a fishing line pinching portion, an elastic portion and a leading end portion. First and second pinching portions of the fishing line pinching portion connect with each other at a first end portion and form an annular shape to fit and support the fishing line. The elastic portion forms a rhombus shape and has first and second elastic portions respectively extending from the first and second pinching portions. First and second leading end portions of the leading end portion extend respectively from the first and second elastic portions to a second end portion and are (Continued)

adjacent to each other. The first and second leading end portions are joined to each other by a joining portion.

4 Claims, 17 Drawing Sheets

(56) References Cited

U.S. PATENT DOCUMENTS

| | | | | |
|---|---|---|---|---|
| 3,404,707 | A * | 10/1968 | Feld | D03J 3/00 |
| | | | | 139/1 R |
| 4,102,478 | A * | 7/1978 | Samoilov | D05B 87/00 |
| | | | | 223/99 |
| 5,129,558 | A * | 7/1992 | Feuerman | D05B 85/00 |
| | | | | 223/102 |
| 5,800,447 | A * | 9/1998 | Wenstrom, Jr. | A61B 17/0485 |
| | | | | 606/139 |
| 6,691,450 | B2 * | 2/2004 | Glavinich | A01K 95/02 |
| | | | | 43/4.5 |
| 8,850,740 | B2 | 10/2014 | Omura | |
| 9,072,514 | B2 * | 7/2015 | Knapp | A61B 17/0485 |
| 9,848,590 | B2 * | 12/2017 | Pangrcic | A01K 99/00 |
| D895,057 | S * | 9/2020 | Arbetter | D22/149 |
| 11,178,861 | B1 * | 11/2021 | Wilcoxon | A01K 97/00 |
| 2003/0019147 | A1 | 1/2003 | Glavinich | |
| 2008/0169320 | A1 * | 7/2008 | Fujiwara | D05B 87/00 |
| | | | | 223/99 |
| 2017/0258064 | A1 * | 9/2017 | Grant | A01K 97/00 |
| 2017/0303521 | A1 | 10/2017 | Arbetter et al. | |

FOREIGN PATENT DOCUMENTS

| | | |
|---|---|---|
| CN | 105307486 A | 2/2016 |
| EP | 2 236 026 A1 | 10/2010 |
| JP | 3016668 U | 10/1995 |
| JP | 8-131032 A | 5/1996 |
| JP | 3040998 U | 9/1997 |
| JP | 10-215745 A | 8/1998 |
| JP | 3069016 U | 5/2000 |
| JP | 2000-237484 A | 9/2000 |
| JP | 2001-346490 A | 12/2001 |
| JP | 2013-116091 A | 6/2013 |
| JP | 5474868 B2 | 4/2014 |
| JP | 3202614 U | 2/2016 |
| JP | 2017-046644 A | 3/2017 |
| KR | 20-1998-010527 U | 5/1998 |

* cited by examiner

FISHING LINE THREADER

CROSS-REFERENCE TO RELATED APPLICATION

This application is based upon and claims the benefit of priorities from Korean Patent Application No. 10-2019-0142374, filed on Nov. 8, 2019, and Korean Patent Application No. 10-2020-0046448, filed on Apr. 17, 2020, the entire contents of which are incorporated herein by reference.

TECHNICAL FIELD

The present disclosure relates to a fishing line threader that is a tool for passing a fishing line through a guide ring of a fishing line guide.

BACKGROUND

When fishing, a fishing line wound around a reel is passed through a guide ring provided in a fishing line guide. To pass the fishing line through the inside of the guide ring, an angler holds the tip of the fishing line and passes the fishing line through the guide ring, or uses a fishing line threader.

An example of a fishing line threader, which can pass the fishing line through the fishing line guide, is disclosed in Japanese Utility Model Registration Publication No. 301668. The fishing line threader disclosed by the aforementioned document includes a leading end portion and a rear portion, which has a spring property and is integrally formed with the leading end portion in a bifurcated shape. One branch of the rear portion has a fixing portion of a fishing line, and the other branch of the rear portion has a portion bent outward. When the fishing line is passed through the fishing line guide, the rear portion is curved against resistance of the spring property and passes through the fishing line guide. After the fishing line passes through the fishing line guide, the rear portion is restored and hinders the threader from passing through the fishing line guide in a reverse direction, thus functioning as a fishing line stopper.

Fishing rods have been evolving so as to improve shortcomings such as a decrease in fishing sensitivity, a heavy feeling of the fishing rod, and a short flying distance of a sinker or lure. In such a context, in consideration of the configuration of a fishing line guide group to be mounted between a tip of the fishing rod and a reel, for example, a fishing line guide group disclosed in Japanese Patent Registration Publication No. 5474868 can be adopted. According to this, it is deemed desirable that the fishing line guide group to be mounted in a tip section located on a tip side of the fishing rod is configured with fishing line guides having a small aperture, a light weight, and the same aperture size.

According to the type of fishing, the fishing line guides to be mounted in the tip section of the fishing rod are minimized in size. That is, the fishing line guides, which are minimized such that their guide rings have an inner diameter of 1.3 mm, are mounted in the tip section. If the fishing line guides are minimized as such, it is very difficult to pass a fishing line by fingers, and the conventional fishing line threader is problematic in that it cannot easily pass through the guide ring.

Further, it is difficult for an angler to identify the inner diameter of the minimized fishing line guide in the tip section with the naked eye, and the spacings of the minimized fishing line guides are very narrow. Thus, the angler feels cumbersome in having to pass the fishing line through the fishing line guides one by one.

Together with the minimization of the fishing line, in the minimized fishing line guides in the tip section, there may occur a case where the angler does not actually pass the fishing line even if the angler believes that the fishing line has passed. In such a case, in order to pass the fishing line again, it is necessary to easily pull back the fishing line in a direction opposite to the direction of passing the fishing line.

SUMMARY

Embodiments of the present disclosure are conceived based on the aforementioned problems of the conventional technology. The fishing line threader according to one embodiment of the present disclosure presents a shape which enables the fishing line to be passed through the minimized fishing line guides and to be easily passed without relying on the naked eye when the fishing line is passed through the fishing line guide group of the tip section. Further, the fishing line threader according to one embodiment of the present disclosure allows the fishing line to be smoothly passed through the guide ring in both directions of the normal and reverse directions. Further, the fishing line threader of the present disclosure does not need to pass the fishing line by a delicate finger operation and is configured so as to cope with any use method matching the angler's preference on the method of using the fishing line threader. Further, the present disclosure provides the fishing line threader which can have a good holding property matching each angler's fingers and overcomes one or more problems in the conventional method.

Disclosed are the embodiments of a fishing line threader for passing a fishing line through guide rings of a plurality of fishing line guides installed successively in a fishing rod. In one embodiment, the fishing line threader comprises a fishing line pinching portion, an elastic portion and a leading end portion. The fishing line threader is composed of a single metallic wire material and has a shape extending along a longitudinal direction as a whole. The fishing line pinching portion has a first pinching portion and a second pinching portion which connect with each other at a first end portion. The first pinching portion and the second pinching portion are in contact with each other at least partially and form an annular shape so as to fit and support the fishing line therebetween. The elastic portion has a first elastic portion extending from the first pinching portion and a second elastic portion extending from the second pinching portion. The elastic portion forms a rhombus shape as a whole such that the first elastic portion and the second elastic portion have vertex portions which are at positions maximally spaced apart in a width direction perpendicular to the longitudinal direction, respectively. The leading end portion includes a first leading end portion and a second leading end portion which extend respectively from the first and second elastic portions to a second end portion in the longitudinal direction and are disposed adjacent to each other. The first and second leading end portions are joined to each other by a joining portion.

According to one embodiment, a length along the longitudinal direction from the vertex portion to the second end portion may be 60% to 80% of an overall length between the first end portion and the second end portion.

According to one embodiment, an overall length along the longitudinal direction between the first end portion and the second end portion may be determined within the range of 75 mm to 115 mm so as to correspond to spacings of three fishing line guides that are installed successively.

According to one embodiment, the fishing line pinching portion includes a twisting portion which is formed by crossing and overlapping at least a portion of the first pinching portion and at least a portion of the second pinching portion.

According to one embodiment, the joining portion is a plurality of joining portions arranged locally, and is formed so as not to form a step protruding from a surface of the leading end portion, and may be formed by spot welding, brazing or soldering.

Further, the present disclosure discloses embodiments of a method of manufacturing a fishing line threader which is configured to pass a fishing line through guide rings of a plurality of fishing line guides installed successively in a fishing rod. The fishing line threader includes: a fishing line pinching portion having a twisting portion and pinching the fishing line; an elastic portion extending from the fishing line pinching portion and forming a rhombus shape as a whole; and a leading end portion extending from the elastic portion in a longitudinal direction. The method of manufacturing the fishing line threader according to one embodiment includes the processes of: manufacturing a single wire material that has an intermediate portion and first and second linear portions obliquely extending from respective ends of the intermediate portion; forming the fishing line pinching portion by folding back the wire material; forming the elastic portion by moving the first and second linear portions; and forming the leading end portion by joining the first and second linear portions. The process of forming the fishing line pinching portion includes: forming a first intermediate portion and a second intermediate portion in the intermediate portion with reference to a bisecting position of the intermediate portion by folding back the wire material with reference to the bisecting position; and forming the twisting portion by performing a squeezing process on the first intermediate portion and the second intermediate portion such that a portion of the first intermediate portion and a portion of the second intermediate portion cross and make contact with each other and are rubbed and overlapped with each other. The process of forming the elastic portion includes aligning the first linear portion and the second linear portion by pushing an end portion of the first linear portion and an end portion of the second linear portion such that the first linear portion located at an upper side is moved toward the second linear portion located at a lower side and the second linear portion located at the lower side is moved toward the first linear portion located at the upper side. The process of forming the leading end portion includes locally joining the first linear portion and the second linear portion to connect the first linear portion and the second linear portion.

By using the fishing line threader according to one embodiment of the present disclosure, the passing of the fishing line can be performed such that the fishing line is smoothly passed through the guide rings of the minimized fishing line guides.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
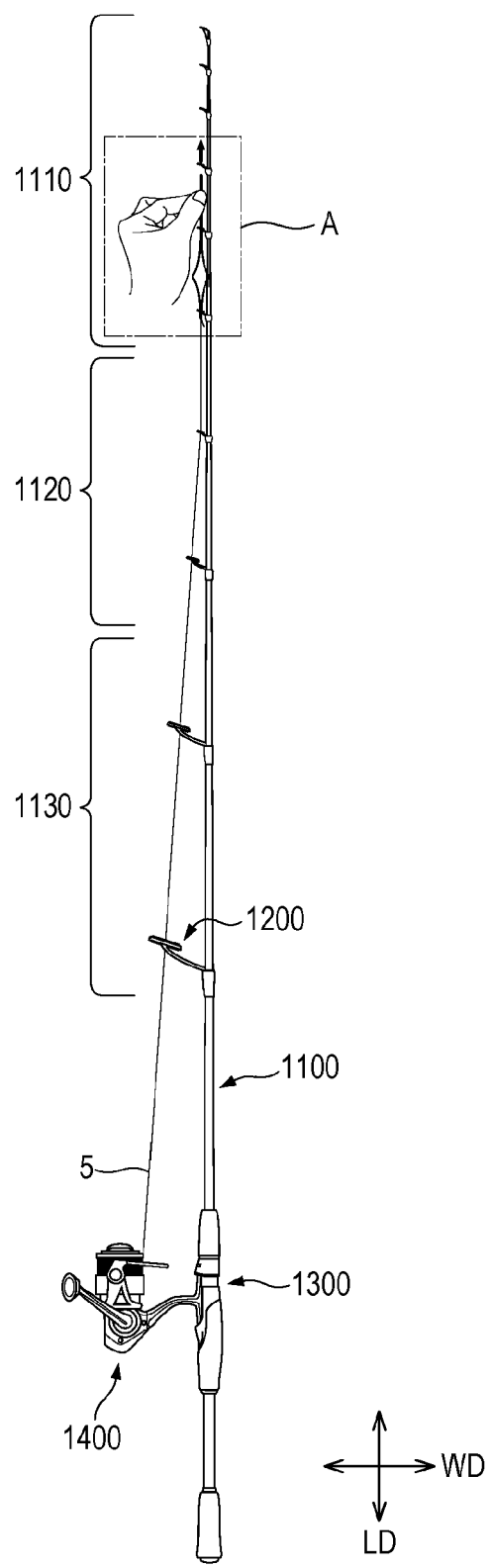
FIG. 1 shows an example where a fishing line threader according to one embodiment of the present disclosure is used in a fishing rod.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

The expressions such as "comprising," "including," "having," and the like used in the present disclosure are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions such as "first," "second," etc. used in the present disclosure are used to separate a plurality of elements from each other, and are not intended to limit an order or importance of the elements.

In the present disclosure, the description that one element is "connected" or "coupled" to another element should be appreciated to indicate that one element may be directly connected, or coupled, to another element, and should be further understood that a new element may be interposed between one element and another element.

The dimensional and numerical values described in the present disclosure are not limited only to the dimensional and numerical values that are described herein. Unless specified otherwise, the dimensional and numerical values may be understood to mean the described values and the equivalent ranges including the values. For example, the dimension of "1.3 mm" described in the present disclosure may be understood to include "about 1.3 mm."

The directional terms "upward," "upper," and the like used in the present disclosure are based on a direction in which a guide ring of a fishing line guide is positioned with respect to a fishing rod in the accompanying drawings, while the directional terms "downward," "lower," and the like mean a direction opposite to the upward or upper direction. The fishing line guide and the fishing rod shown in the accompanying drawings may be oriented differently, and the directional terms may be construed accordingly.

Descriptions are made hereinafter as to the embodiments of the present disclosure with reference to the accompanying drawings. Like reference numerals in the drawings denote like or corresponding elements. Further, in the following description of the embodiments, duplicate descriptions for the same or corresponding elements may be omitted. However, even if the descriptions of the elements are omitted, such elements are not intended to be excluded in any embodiment.

Figure 2:
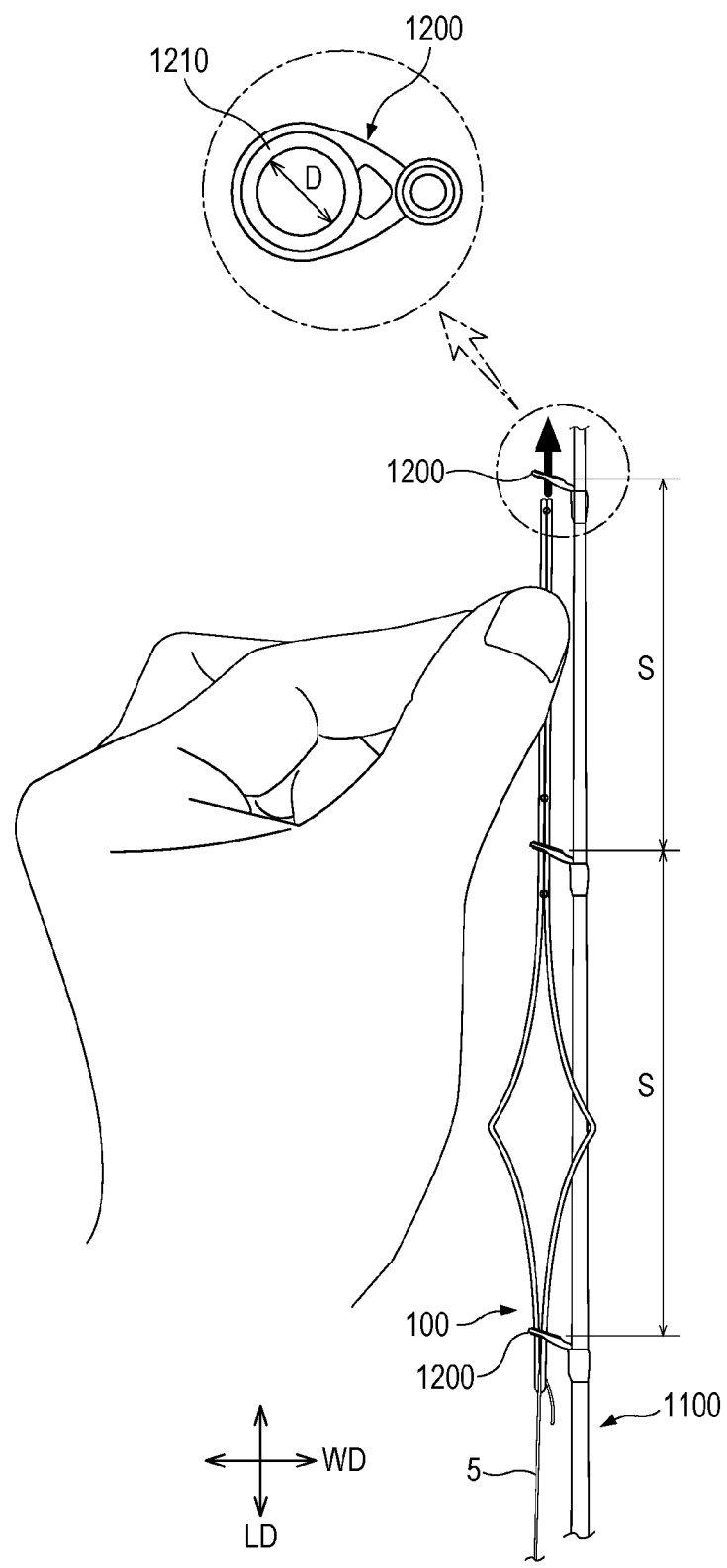
FIG. 2 is an enlarged view of portion A of FIG. 1.

FIG. 1 shows an example where a fishing line threader according to one embodiment of the present disclosure is used in a fishing rod. FIG. 2 is an enlarged view of portion A of FIG.

The fishing line threader 100 according to one embodiment of the present disclosure is a tool devised so as to cope with a "minimized diameter ring" of a fishing line guide 1200 which is recently used in the field of a fishing rod (i.e., a fishing line guide that has a fairly small diameter and, therefore, is so sized as to allow a fishing line to barely pass through the fishing line guide). Referring to FIG. 1, the fishing rod 1100 may be divided into three sections within a range where the fishing line guides 1200 are mounted, from a portion having a small cross-sectional diameter toward a portion having a large cross-section diameter. For example, the fishing rod 1100 may have a tip section 1110, a belly section 1120, and a butt section 1130. The tip section 1110 may be located at a position most distant from the butt section 1130 (at a position most distant from a reel seat 1300 on which a reel 1400 is mounted).

Referring to FIGS. 1 and 2, the fishing line threader 100 can easily pass a fishing line through the fishing line guides 1200 which are installed at a very narrow spacing S at the tip section 1110 of the fishing rod 1100. Even if an angler misses passing the fishing line through some of the fishing line guides 1200, the fishing line threader 100 can easily pass the fishing line through the fishing line guide again. Further, the fishing line threader 100 may be designed in a universal design which enables an angler to freely hold the fishing line threader 100 in any direction (i.e., the direction of holding the fishing line threader) when passing the fishing line.

Since the weight reduction of the tip section 1110 in a fishing rod can enhance the original performance of the fishing rod, "minimization" of the fishing line guides 1200 has been attempted at the tip section 1110. In this regard, a plurality of fishing line guides 1200, in which the diameters of guide rings 1210 are an approximately "small aperture" (i.e., the diameter D is considerably small) and which have the guide rings of the same aperture, may be mounted successively in the tip section 1110. Referring to FIG. 2, the diameter D of the guide rings 1210 may be minimized up to, for example, 1.3 mm.

The fishing line 5 is also made extremely fine as the fishing line guides 1200 are minimized. Thus, it may be difficult to identify the fishing line 5 and the fishing line guide 1200 with the naked eye. Accordingly, even if an angler believe that the fishing line has been passed through the inside of the guide ring 1210 of the fishing line guide 1200, the angler may start fishing in the situation where the angler is not aware that the fishing line has not actually been passed. In such a case, there may occur a problem in that the fishing line becomes entangled.

The fishing line threader 100 according to one embodiment of the present disclosure is a tool for passing the fishing line 5 through the minimized fishing line guides 1200, and has a shape of guiding the fishing line 5 such that the fishing line 5 can be passed through the successive fishing line guides 1200 at the tip section 1110 in particular. Therefore, the fishing line threader can easily and reliably pass the fishing line 5 through the fishing line guides.

The fishing line threader 100 can pull back the fishing line without being caught on the fishing line guide 1200 again in a direction opposite to a direction of passing the fishing line 5 through the fishing line guide 1200. Even if the passing of fishing line 5 is missed at some of the fishing line guides 1200, the fishing line threader can easily pull back the fishing line 5 and resume the passing of the fishing line 5.

The fishing line threader 100 has a universal design which allows the fishing line threader to function to pass the fishing line 5 through the fishing line guides 1200 that are fixed to the tip section 1110 of the fishing rod requiring a delicate finger operation, even if an angler holds the fishing line threader 100 by any method. Therefore, the fishing line threader can have a good holding property matching each angler's preference.

Figure 3:
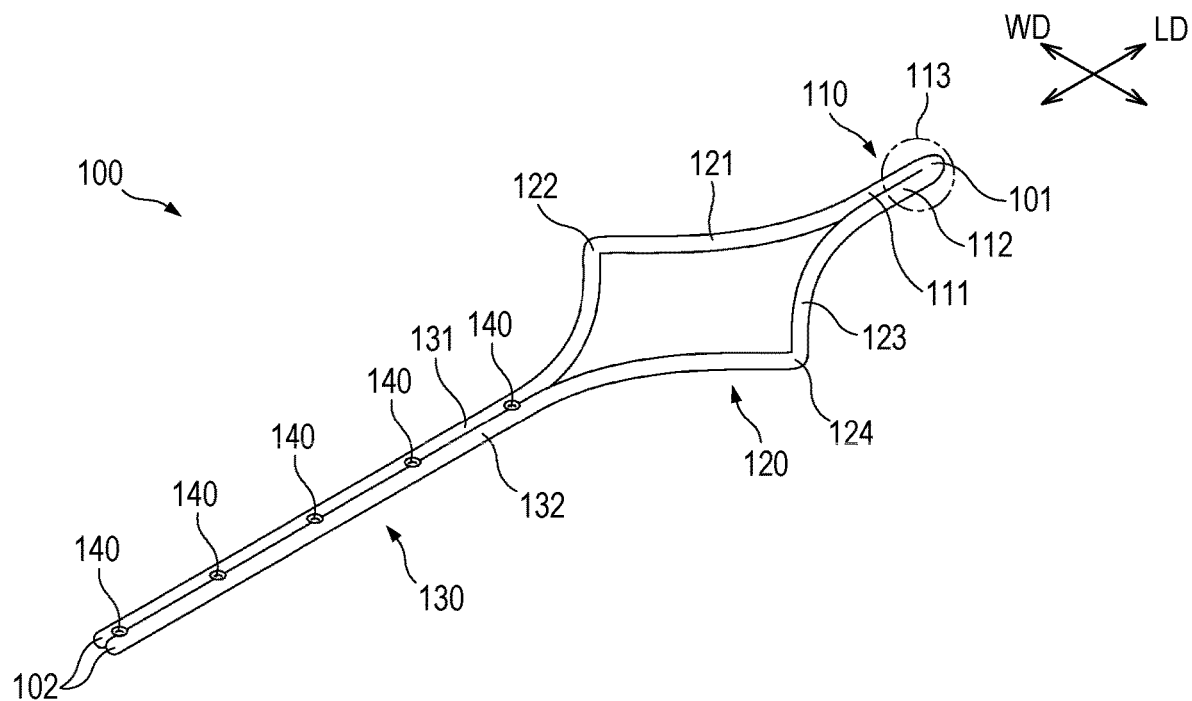
FIG. 3 is a perspective view showing a fishing line threader according to one embodiment of the present disclosure.

FIG. 3 is a perspective view showing the fishing line threader 100 according to one embodiment of the present disclosure. Descriptions are made below with reference to FIGS. 1 to 3.

The fishing line threader 100 is a tool for passing the fishing line 5 through the inside of the guide rings 1210 of the plurality of fishing line guides 1200 that are installed successively in the fishing rod. The fishing line threader 100 may be manufactured from a single wire material. The wire material may include any metallic material as long as it has elasticity. The metallic material having elasticity may include a SW-C (hard drawn steel wire), a SWP-AB (piano wire type A/type B), or SUS304-WPB/SUS316-WPB (stainless steel wire), bus is not limited thereto. The fishing line threader may be used outdoors in an environment where seawater adheres to the fishing line threader. Thus, preferably, the SUS304-WPB/SUS316-WPB, which has good corrosion resistance, may be used as the metallic material. Alternatively, the wire material may be composed of a material having rigidity and elasticity other than the metallic material.

The fishing line threader 100 may have a shape extending from a first end portion 101 to a second end portion 102 along a longitudinal direction LD as a whole. The fishing line threader 100 may be divided into a fishing line pinching portion 110, an elastic portion 120, and a leading end portion 130 along the longitudinal direction LD. The first end portion 101 may be formed at an end of the fishing line pinching portion 110 in the longitudinal direction LD, while the second end portion 102 may be formed at an end of the leading end portion 130 in the longitudinal direction LD. The first end portion 101 and the second end portion 102 are spaced apart in the longitudinal direction LD, and may form either end of the fishing line threader 100. The fishing line threader 100 may be formed by being bent with reference to the first end portion 101.

The fishing line pinching portion 110 fixes the fishing line in a manner of pinching the fishing line. The fishing line pinching portion 110 may have a first pinching portion 111 and a second pinching portion 112. The first pinching portion 111 and the second pinching portion 112 connect with each other at the first end portion 101. The first pinching portion 111 and the second pinching portion 112 of the fishing line pinching portion 110 may form an annular shape so that the fishing line 5 can be caught at the first end portion 101 side. That is, an annular portion 113, which becomes the annular shape formed by the first and second pinching portions 111 and 112, is formed in the fishing line pinching portion 110. The first pinching portion 111 and the second pinching portion 112 are in contact with each other at least partially and may be formed so as to fit the fishing line between the first pinching portion 111 and the second pinching portion 112 and support the fishing line (that is, to pinch the fishing line therebetween).

When the fishing line is fixed to the fishing line threader 100, the fishing line is passed through the elastic portion 120 and is then inserted to the fishing line pinching portion 110, i.e., inserted into between the first pinching portion 111 and the second pinching portion 112. The first pinching portion 111 and the second pinching portion 112, which are bent at the first end portion 101 in opposite directions, apply an elastic force toward each other. Therefore, the fishing line fitted between the first pinching portion 111 and the second pinching portion 112 is fixed to the first pinching portion 111 and the second pinching portion 112, and is moved together with the fishing line pinching portion 110 when the fishing line threader 100 is moved.

The elastic portion 120 may have a first elastic portion 121 extending from the first pinching portion 111, and a second elastic portion 123 extending from the second pinching portion 112. The first elastic portion 121 may have a first vertex portion 122 and the second elastic portion 123 may have a second vertex portion 124. The first and second vertex portions 122 and 124 are at positions that are maximally spaced apart in a width direction WD perpendicular to the longitudinal direction LD in the elastic portion 120. The elastic portion 120 may form a rhombus shape as a whole. The first vertex portion 122 is located at a predetermined position in the first elastic portion 121, and the second vertex portion 124 is located at a predetermined position in the second elastic portion 123. In the rhombus shape of the elastic portion 120, portions of the first elastic portion 121, which are located at either sides of the first vertex portion 122, may take a shape that is curved convexly toward a center of the rhombus shape of the elastic portion 120. Further, portions of the second elastic portion 123, which are located at either sides of the second vertex portion 124, may take a shape that is curved convexly toward the center of the rhombus shape of the elastic portion 120.

When an angler holds the fishing line threader 100, the elastic portion 120 can be elastically deformed. For example, if an angler presses the first and second vertex portions 122 and 124 inward in the width direction WD, the overall length of the fishing line threader 100 can be increased while the elastic portion 120 elastically deforms, and the rhombus shape of the elastic portion 120 can contract in the width direction WD. Conversely, if the angler releases the force pressing the elastic portion 120, the elastic portion 120 returns to its original rhombus shape.

The leading end portion 130 may have a shape extending in the longitudinal direction LD. For example, the leading end portion 130 may have a length that enables the leading end portion to pass through a plurality of the fishing line guides 1200. The leading end portion 130 may include a first leading end portion 131 and a second leading end portion 132, which extend in the longitudinal direction LD from the first and second elastic portions 121 and 123, respectively, to the second end portion 102, and are disposed adjacent to each other. Further, the first and second leading end portions 131 and 132 may be joined to each other by one or more joining portions 140 which are locally or discontinuously arranged so as not to form a step protruding from a surface of the leading end portion 130. The joining portion 140 may be formed by spot welding, brazing, or soldering.

Figure 4A:
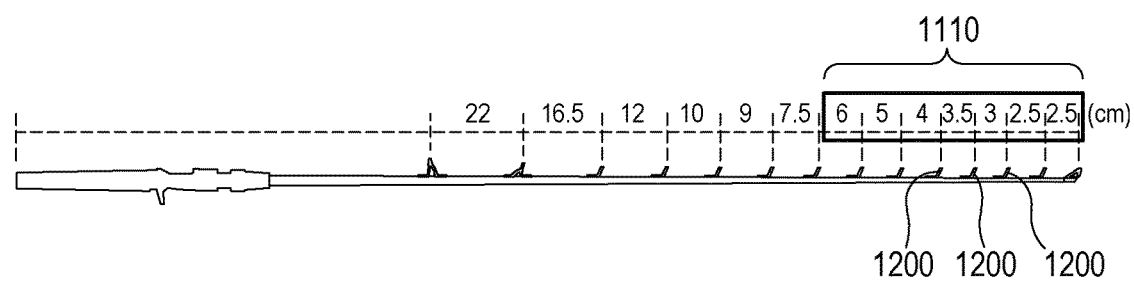
FIG. 4A is a side view of a fishing rod showing an example of spacings of fishing line guides at a tip section of a fishing rod.
Figure 4B:
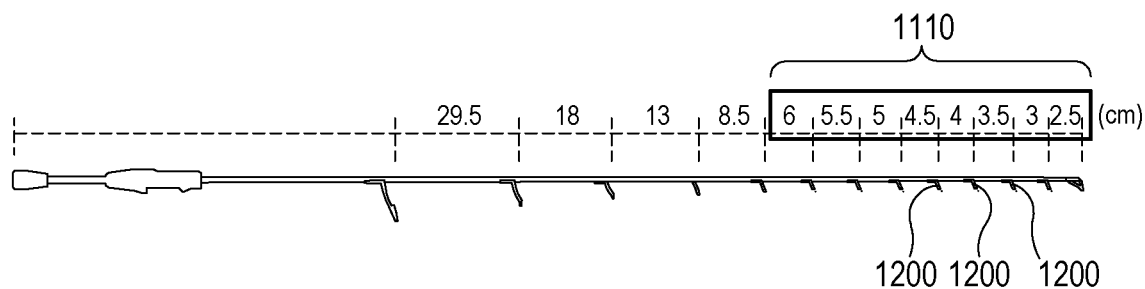
FIG. 4B is a side view of a fishing rod showing another example of spacings of fishing line guides at a tip section of a fishing rod.

FIGS. 4A and 4B show examples of spacings of the fishing line guides 1200 at the tip section 1110 of the fishing rod. The spacings shown in FIGS. 4A and 4B may be explained as one exemplary spacing.

To enable the fishing line threader 100 to smoothly pass the fishing line 5, the fishing line threader 100 preferably has a length by which the fishing line threader passes through two or more fishing line guides 1200 at a time and can approximately approach the third fishing line guide. If the fishing line threader 100 has only a length corresponding to the spacing between two fishing line guides 1200, the stability of the passing of the fishing line 5 through the third fishing line guide may be reduced due to the movement in the width direction WD while moving the fishing line threader 100 along the longitudinal direction LD. Accordingly, in view of the spacings of the fishing line guides 1200 shown in FIGS. 4A and 4B, the fishing line threader may be designed so that the length of the fishing line threader 100 can correspond to the spacings of the three successive fishing line guides 1200.

Figure 5:
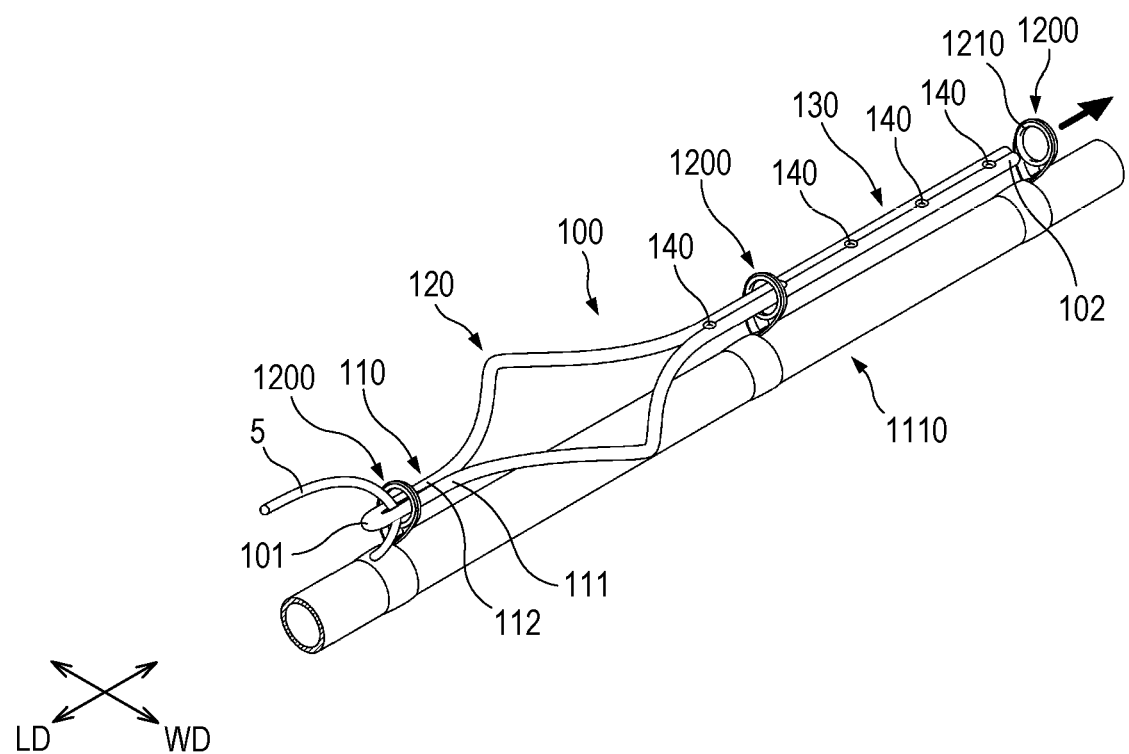
FIG. 5 is a perspective view showing an example where a fishing line threader according to one embodiment of the present disclosure passes through fishing line guides.
Figure 6:
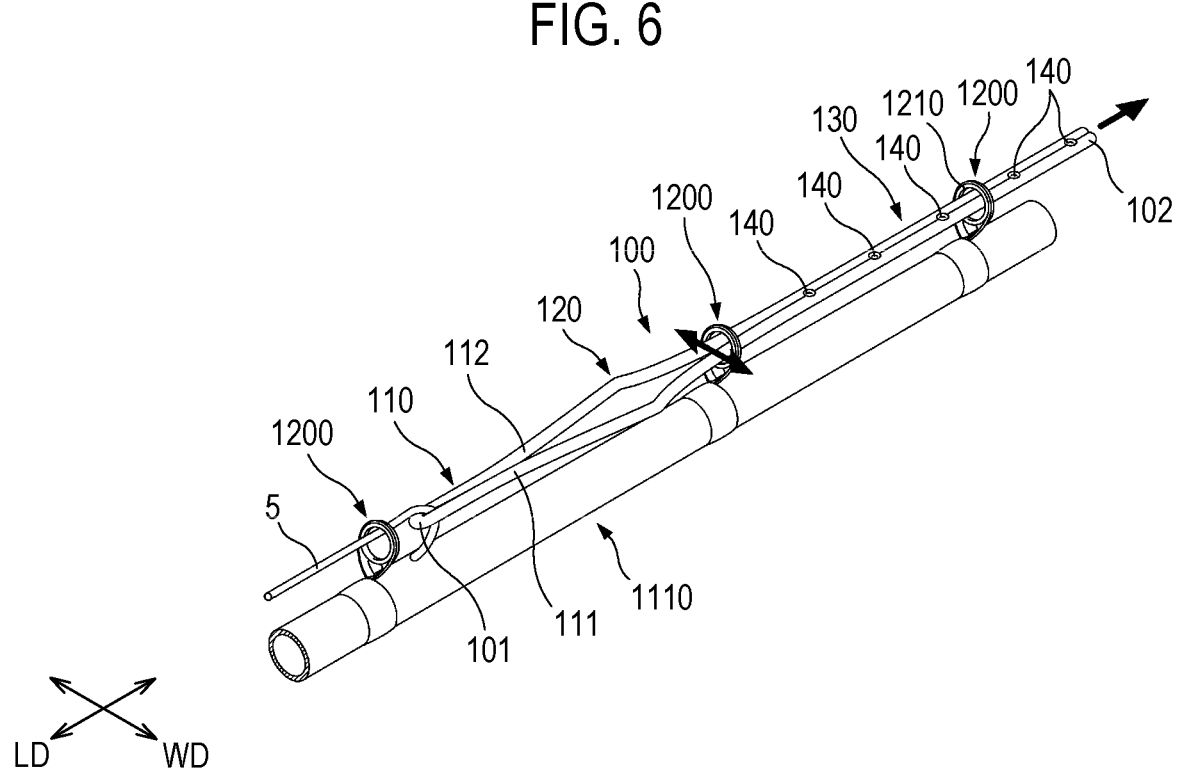
FIG. 6 is a perspective view showing another example where a fishing line threader according to one embodiment of the present disclosure passes through fishing line guides.

FIGS. 5 and 6 are perspective views showing examples where the fishing line threader 100 according to one embodiment of the present disclosure passes through the fishing line guides 1200.

The fishing line pinching portion 110 can fit the fishing line 5 therein and support the fishing line 5. When the fishing line threader 100 is moved in the longitudinal direction LD in the state where the fishing line 5 is inserted and fitted between the first pinching portion 111 and the second pinching portion 112 constituting the fishing line pinching portion 110, since the fishing line 5 is caught by the first end portion 101 and pinching the fishing line is done by the fishing line pinching portion 110, the fishing line 5 can be moved together with the fishing line threader 100. Accordingly, the fishing line 5 can be firmly fixed to the fishing line threader 100 through the fishing line pinching portion 110 without performing the work of knotting and binding the fishing line 5 in order to fix the fishing line 5 to the fishing line pinching portion 110.

Referring to FIG. 5, the fishing line threader 100 may be formed from a single metallic wire material. Both ends of the single metallic wire material are put together at the leading end portion 130 and form the second end portion 102. The leading end portion 130 is joined by the joining portion 140 such that the step protruding the surface of the leading end portion 130 is not formed. The joining portion 140 does not form a portion protruding in a thickness direction of the leading end portion 130. Therefore, when the fishing line threader 100 is passed through the inside of the guide ring 1210, the fishing line 5 can smoothly pass through the guide ring 1210. This is because the fishing line threader 100 is not formed with a portion that is caught on the guide ring 1210.

Referring to FIGS. 5 and 6, while the fishing line threader 100 passes through the fishing line guides 1200, the fishing line 5 is passed through the inside of the guide ring 1210. At this time, the elastic portion 120 is brought into contact with the guide ring of the fishing line guide 1200 at outer surfaces of the curved first and second elastic portions. A reaction force, which is against a force of moving the fishing line threader 100, is applied from the guide ring to the elastic portion 120. The elastic portion 120 is elastically deformed due to the reaction force in a direction of narrowing the rhombus shape. While the elastic portion is passing through the guide ring, a gap hardly exists inside the elastic portion 120. Since the first and second elastic portions of the elastic portion 120 are curved, the reaction force of the guide ring can deform the elastic portion 120 smoothly. While the elastic portion 120 is passing through the guide ring, the first and second elastic portions of the elastic portion 120 may be elastically deformed so as to overlap with each other.

Referring to FIG. 6, even if an angler takes his or her fingers away from the elastic portion while passing the fishing line 5 through the guide ring 1210, the elastic portion 120 of the fishing line threader 100 can halt the fishing line threader between the fishing line guides 1200 at such a location due to the elastic restoring force of the elastic portion 120. Further, since the elastic portion 120 has a spring property (i.e., the elastic restoring force of the elastic portion 120) which enables the elastic portion to expand outward (i.e., in the width direction WD) within the guide ring included in the fishing line guide 1200, the second end portion 102 of the leading end portion 130 can be aligned so as to be directed toward an approximate center of the guide ring 1210 located immediately next thereto. That is, at the tip section 1110 of the fishing rod where the same fishing line guides 1200 or the fishing line guides 1200 having an approximately identical size are mounted, if the fishing line threader 100 passes through two or more fishing line guides 1200, the leading end portion 130 of the fishing line threader 100 is aligned so as to be directed toward an approximate center of the guide ring 1210 of the third fishing line guide 1200 located immediately next thereto. Accordingly, even if the angler does not perform a process of adjusting the fishing line threader with the naked eye one by one such that the leading end portion 130 of the fishing line threader 100 is directed toward the center of the guide ring 1210, the fishing line 5 can be passed through the guide rings 1210 easily and successively.

Figure 7A:
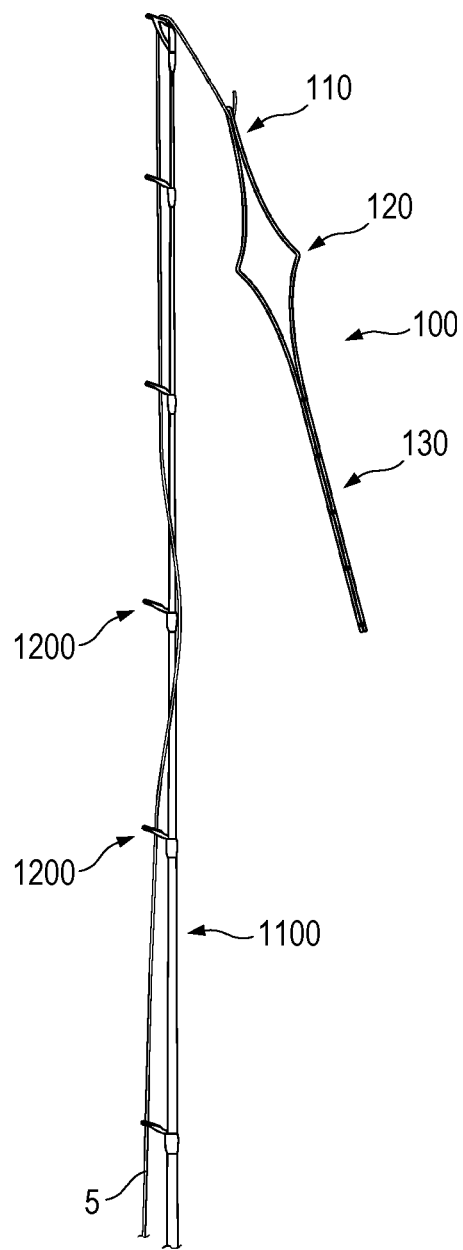
FIG. 7A shows an example where a fishing line threader according to one embodiment of the present disclosure is used in a fishing rod, and shows a situation where a fishing line is not passed through some of fishing line guides.
Figure 7B:
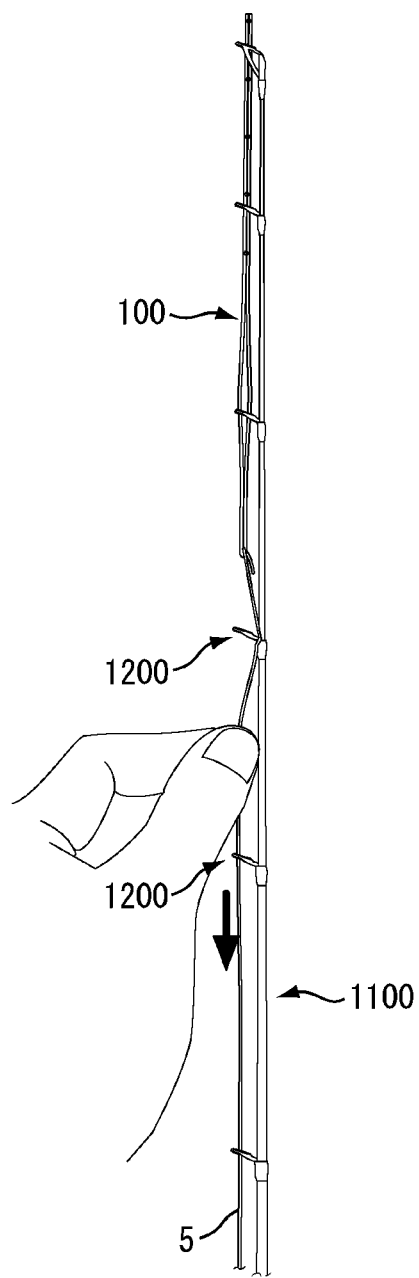
FIG. 7B shows an example of pulling back the fishing line threader from a situation shown in FIG. 7A.
Figure 7C:
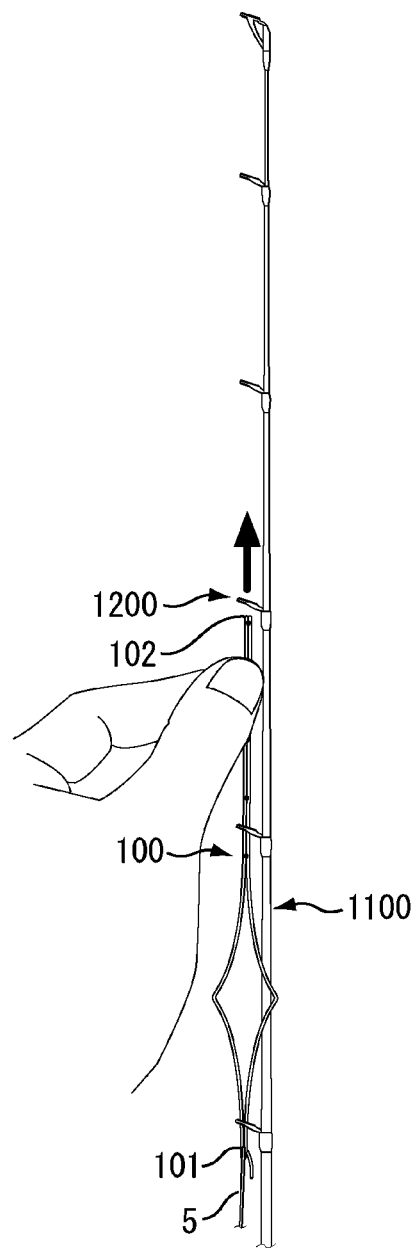
FIG. 7C shows an example where the passing of the fishing line is performed again by the fishing line threader.

FIGS. 7A to 7C show examples where the fishing line threader 100 according to one embodiment of the present disclosure is used in the fishing rod 1100.

FIG. 7A shows the state where passing of the fishing line 5 is missed at some of the fishing line guides 1200. That is, there may be a case where an angler may miss some of the fishing line guides and then pass the fishing line through the next fishing line guide when passing the fishing line 5 through the fishing line guides by means of the fishing line threader 100. FIG. 7B shows an example of pulling back the fishing line threader 100. If the situation shown in FIG. 7A occurs, the fishing line threader 100 is moved in the direction opposite to the original advancing direction as shown in FIG. 7B. FIG. 7C shows a situation where passing of the fishing line 5 is performed again after the fishing line threader 100 is pulled back as shown in FIG. 7B.

The fishing line threader 100 is formed from a single metallic wire material, and end portions of the fishing line threader are put together and are joined at the leading end portion 130. Further, the fishing line threader 100 is configured such that steps protruding convexly outward are not formed in the surfaces of the fishing line pinching portion 110 and the leading end portion 130. Thus, when the fishing line threader 100 is passed through the fishing line guides 1200 in both directions of a normal direction (i.e., a direction where the second end portion 102 is directed toward the tip of the fishing rod) and a reverse direction (i.e., a direction where the first end portion 101 is directed toward the tip of the fishing rod), or when the fishing line threader is pulled back in the opposite direction, the fishing line threader 100 can pass through the fishing line guides 1200 without being caught on the fishing line guides 1200.

Figure 8A:
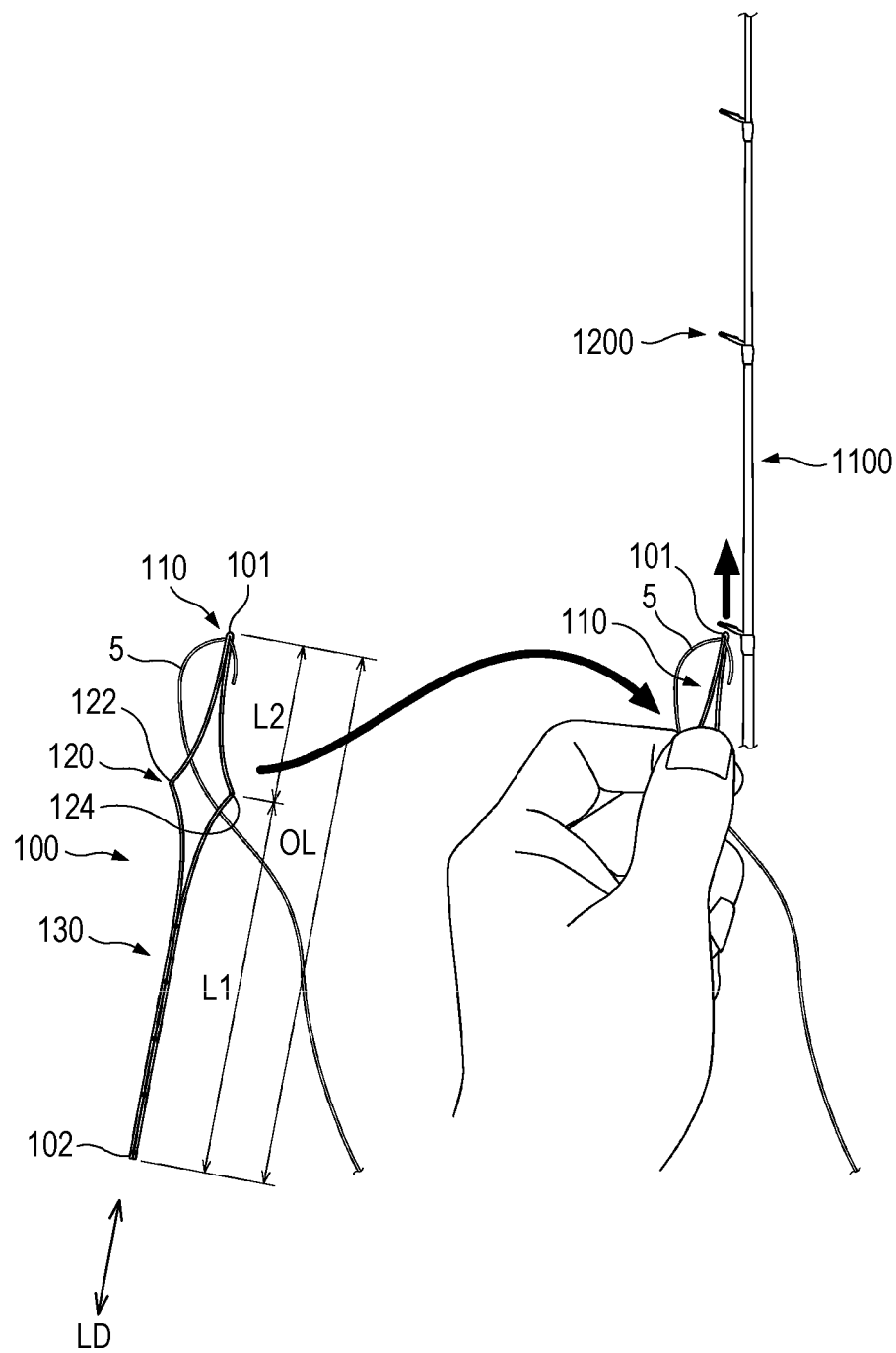
FIG. 8A shows an example where the fishing line threader according to one embodiment of the present disclosure is used in the fishing rod in a direction opposite to the direction shown in FIG. 7C.
Figure 8B:
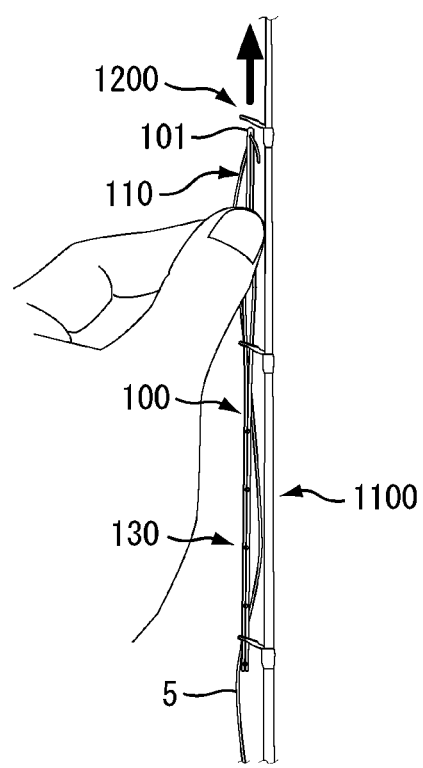
FIG. 8B shows an example where the fishing line threader according to one embodiment of the present disclosure is used in a reverse direction.

FIGS. 8A and 8B show examples where the fishing line threader 100 according to one embodiment of the present disclosure is used in the fishing rod 1100 in the reverse direction opposite to the normal direction shown in FIG. 7C.

The fishing line threader 100 is formed with a universal design that enables an angler to use the fishing line threader so as to direct the fishing line pinching portion 110 in the passage direction of the fishing line 5 according to the angler's preference on the methods of holding the fishing line threader 100. Accordingly, the fishing line threader 100 can have a good holding property matching each angler's preference.

FIG. 8A shows an example where the first end portion 101 of the fishing line pinching portion 110 is placed toward the directing point (i.e., the tip of the fishing rod) of the passage direction of the fishing line 5. An overall length OL is an overall length of the fishing line threader 100 along the longitudinal direction LD, and can be defined as a length between the first end portion 101 and the second end portion 102. A length L1 can be defined as a length from the vertex portion 122 or 124 to the second end portion 102. A length L2 can be defined as a length from the vertex portion 122 or 124 to the first end portion 101.

The elastic portion 120 has a rhombus shape. Thus, advantageously, holding the elastic portion is stably performed when an angler holds the elastic portion 120. Further, the length L2 at the fishing line threader 100 side is shorter that the length L1 at the leading end portion 130 side. Thus, aiming the fishing line threader 100 toward the fishing line guide 1200 can be easier in the case of using the fishing line threader 100 in the reverse direction shown in FIG. 8A than the case of using the fishing line threader in the normal direction shown in FIG. 7C.

There are no steps protruding from the surface of the fishing line pinching portion 110. Thus, even if the fishing line pinching portion 110 is directed in the passage direction of the fishing line 5, the case where the fishing line pinching portion 110 is caught on the fishing line guide 1200 while being passed therethrough does not occur.

Referring to FIG. 8B, even if the fishing line pinching portion 110 is directed in the passage direction of the fishing line 5 (i.e., when the fishing line threader 100 is used in the reverse direction), the first end portion 101 of the fishing line pinching portion 110 can be easily aligned (aimed) toward the center of the guide ring of the fishing line guide 1200 as in the case where the leading end portion 130 is directed in the passage direction of the fishing line 5 (i.e., the case where the fishing line threader 100 is used in the normal direction).

Figure 9:
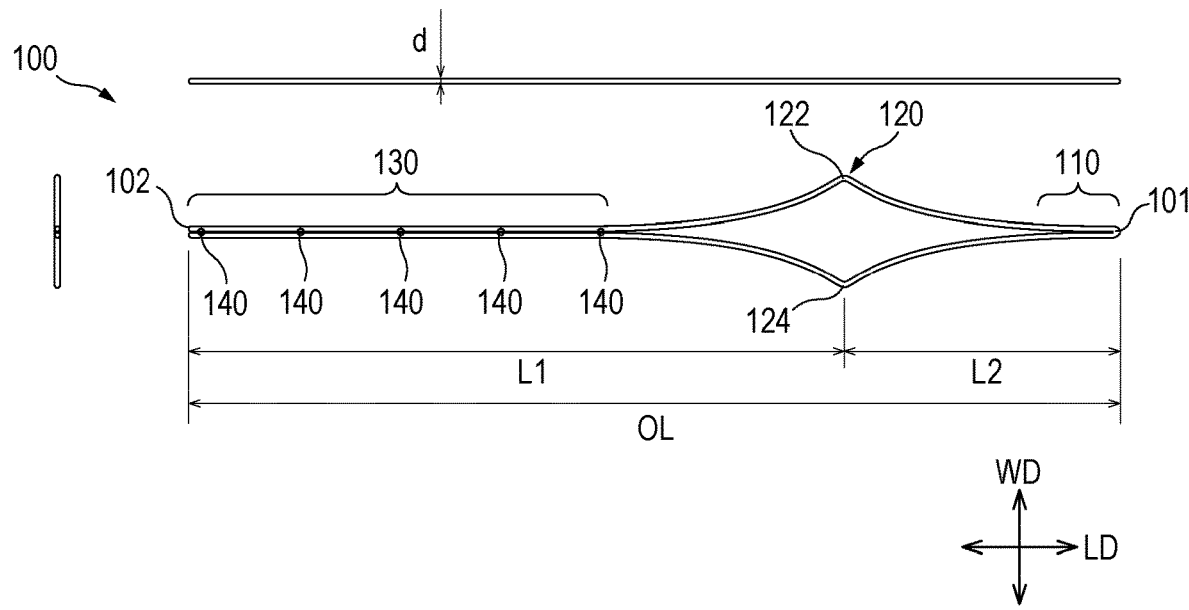
FIG. 9 shows an example of a thickness and longitudinal configuration of a fishing line threader according to one embodiment of the present disclosure.
Figure 10A:
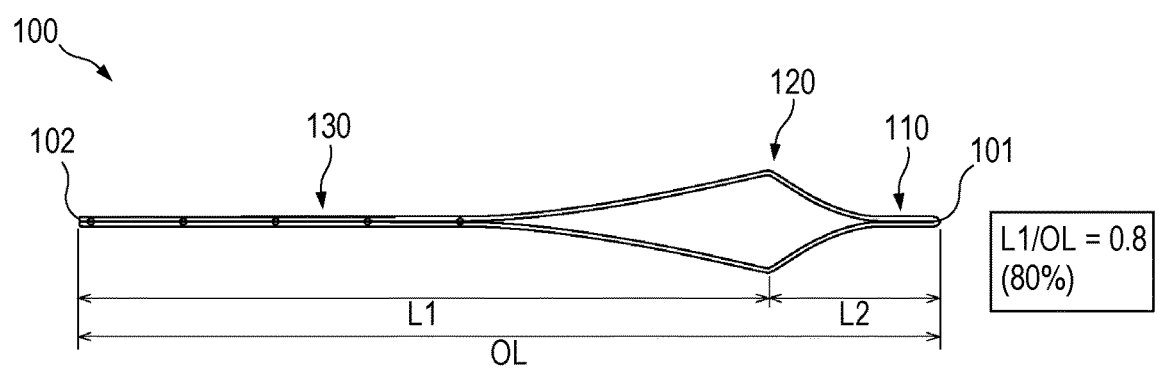
FIG. 10A shows another example of a longitudinal configuration of a fishing line threader according to one embodiment of the present disclosure.
Figure 10B:
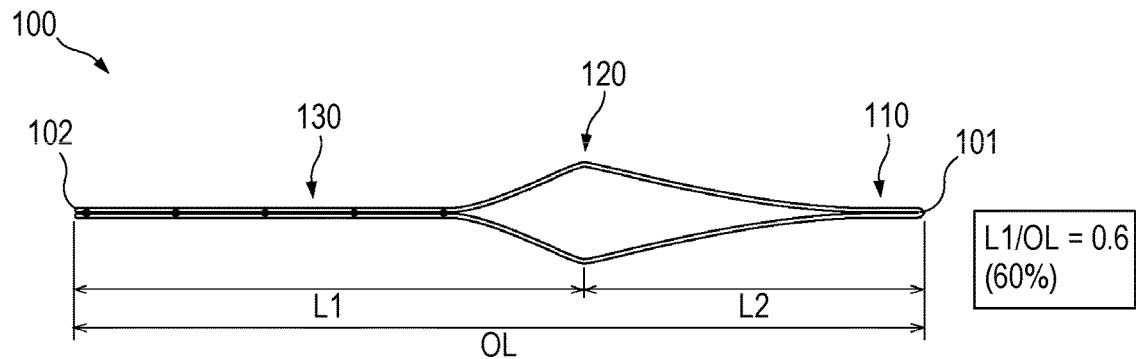
FIG. 10B shows a further example of a longitudinal configuration of a fishing line threader according to one embodiment of the present disclosure.
Figure 11:
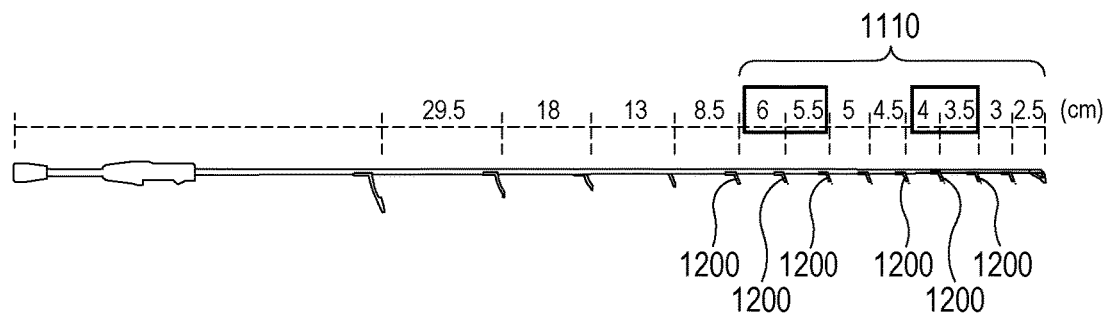
FIG. 11 illustrates spacings of fishing line guides at a tip section of the fishing rod.
Figure 12A:
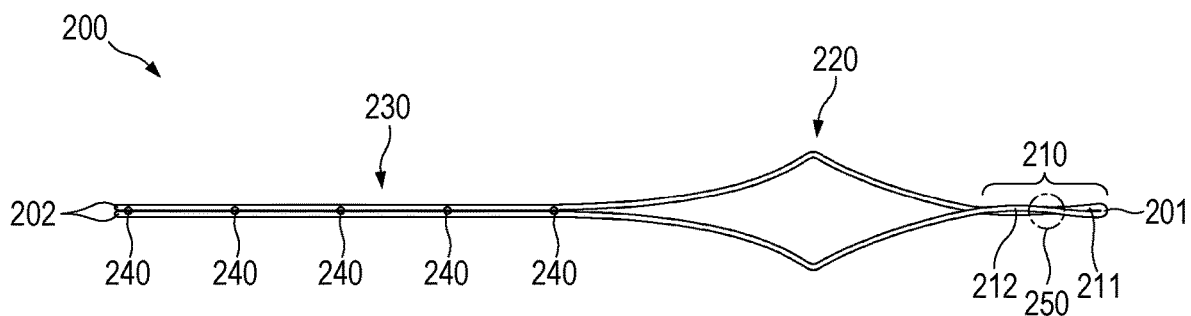
FIG. 12A is a plan view showing a fishing line threader according to another embodiment of the present disclosure.
Figure 12B:
FIG. 12B is a side view of the fishing line threader shown in FIG. 12A.
Figure 12C:
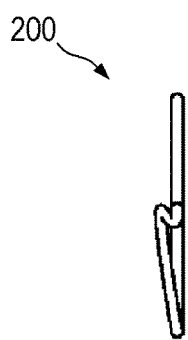
FIG. 12C is a rear view of the fishing line threader shown in FIG. 12A.

FIGS. 9, 10A, and 10B show examples of a thickness and longitudinal configuration of the fishing line threader 100 according to one embodiment of the present disclosure. FIG. 11 illustrates spacings of the fishing line guides 1200 at the tip section 1110 of the fishing rod.

The fishing line threader 100 is formed from a single metallic wire material. The metallic wire material is folded back at a folding-back position of the fishing line pinching portion 110 (i.e., at the first end portion 101). Both end portions of the metallic wire material are put together and are joined at the leading end portion 130. The leading end portion 130 and at least a portion of the fishing line pinching portion 110 are formed in a linear shape without bending. The elastic portion 120 between the fishing line pinching portion 110 and the leading end portion 130 may have a spring property.

Considering that the fishing line threader 100 needs to pass through the inside of the guide ring of the minimized fishing line guide 1200 and, on the other hand, requires elasticity, the metallic wire material may have a diameter (d) of 0.2 mm to 0.6 mm.

If the leading end portion 130 is joined by spot welding to form the joining portion 140, the steps protruding from the surface of the leading end portion 130 are not formed. Thus, the aforementioned spot welding is preferable for the joining method. If the number of joining locations (i.e., the number of the joining portions 140) is three to six, sufficient joining strength may be obtained, but the number of the joining locations is not limited thereto. As another joining method, the leading end portion 130 may be joined by soldering.

Referring to FIGS. 9, 10A, and 10B, the length from the vertex portion 122 or 124 of the elastic portion 120 to the second end portion 102 of the leading end portion 130 side may be referred to as the length L1, and the length from the vertex portion 122 or 124 to the first end portion 101 of the fishing line pinching portion 110 side may be referred to as the length L2.

As shown in FIGS. 9, 10A, and 10B, the fishing line threader 100 may be formed such that the length L2 and the length L1 are different, that is, the length L2 is shorter than the length L1. Alternatively, in the opposite case, it is possible that the length L1 is shorter than the length L2. Some anglers may believe that the shorter the distance from the point where the fishing line threader 100 is held to the tip point in the passage direction of the fishing line 5 is, the easier the passing route of the fishing line can be aimed. By setting the length L2 and the length L1 such that they are different from each other, various use methods can be possible according to the angler's preference.

The length L1 may be 60% to 80% of the overall length OL of the fishing line threader 100. By setting the length L1 as such, the difference between the length L1 and the length L2 becomes clear. Thus, an angler can easily determine a convenient use method matching his or her own preference with the naked eye. That is, the angler can set a direction corresponding to his or her own preference and more conveniently perform the passing of the fishing line. FIG. 10A shows an example where the length L1 is 80% of the overall length OL, and FIG. 10B shows an example where the length L1 is 60% of the overall length OL. The elastic portion 120 shown in FIGS. 10A and 10B does not have a symmetrical shape, but may take a shape in which that one portion of the elastic portion located at one side with reference to the vertex portion is longer than the other portion of the elastic portion located on the other side.

Referring to FIG. 11, the distance between three fishing line guides 1200, which are successively mounted in the tip section 1110 where the fishing line threader is used, may be approximately 115 mm (60 mm+55 mm=115 mm). Thus, if the overall length OL of the fishing line threader 100 is approximately 115 mm, the fishing line threader is passed through two or more fishing line guides 1200 at the tip section 1110 and, at the same time, can nearly approach the third fishing line guide. Thus, the passing of the fishing line 5 can be easily performed. Further, if the overall length OL of the fishing line threader 100 is equal to or more than approximately 75 mm (40 mm+35 mm=75 mm), the angler can avoid the inconvenience of aiming the second end portion 102 of the leading end portion 130 at the guide ring of the fishing line guide 1200 each time, even when the spacings of the fishing line guides 1200 become gradually narrower toward the tip of the fishing rod at the tip section 1110.

FIGS. 12A to 12C and 13 show a fishing line threader 200 according to another embodiment of the present disclosure. The descriptions that are duplicative of the descriptions in the foregoing embodiments are omitted below.

The fishing line threader 200 according to another embodiment may include a fishing line pinching portion 210, an elastic portion 220, a leading end portion 230, and a joining portion 240 joining the leading end portion 230. The fishing line pinching portion 210 may have a first pinching portion 211 and a second pinching portion 212.

The fishing line pinching portion 210 may have a twisting portion 250 that is formed by crossing and overlapping portions of the first and second pinching portions 211 and 212. Referring to FIGS. 12A to 12C and 13, the twisting portion 250 may be located adjacent to an annular portion 213 which becomes an annular shape formed by the first and second pinching portions 211 and 212 in the fishing line pinching portion 210. The twisting portion 250 of the fishing line pinching portion 210 is formed by twisting the metallic wire material constituting the fishing line pinching portion 210. The twisting portion 250 of the fishing line pinching portion 210 may be formed such that at least a portion of the first pinching portion 211 and at least a portion of the second pinching portion 212 cross and make contact with each other and are rubbed and overlapped with each other (that is, such that the metallic wire materials constituting the fishing line pinching portion are pressed so as to form a contacted portion).

If the twisting portion 250 is formed such that at least portions of the first and second pinching portions 211 and 212 cross and make contact with each other and are rubbed and overlapped with each other, the twisting portion 250 can generate the most frictional resistance in the fishing line 5 within the range of the fishing line pinching portion 210 when the fishing line 5 is inserted into the fishing line pinching portion 210. When an angler fixes the fishing line 5 to the fishing line pinching portion 210, a force can be strongly applied to the fingertip holding the fishing line 5 at the twisting portion 250 (see the fishing line shown by a solid line in FIG. 13). After the fishing line 5 passes through the twisting portion 250, frictional resistance is reduced. Accordingly, the force applied to the finger weakens, and the angler can sense the feeling that the fishing line 5 is moving smoothly into the fishing line pinching portion 210 (see the fishing line shown by an alternated long and short dash line in FIG. 13). In other words, when the fishing line 5 is being inserted through the twisting portion 250 up to the annular shape of the fishing line pinching portion 210, the twisting portion 250 can give a resistant feeling to the insertion of the fishing line, and the fishing line can be fixed to the fishing line pinching portion 210 by a kind of a snap feeling. Accordingly, the angler can recognize, without checking with the naked eye, that the fishing line 5 is fixed at the fishing line pinching portion 210 only with the tactile feeling of the fingertip, and the angler can have a feeling of relief since the angler becomes aware that fixing the fishing line 5 to the fishing line pinching portion 210 is successfully performed.

FIGS. 14A to 14D illustrate manufacturing processes of the fishing line threader 100 according to one embodiment of the present disclosure. The fishing line threader 100 may be manufactured by the procedures shown in FIGS. 14A to 14D and the manufacturing process shown in each procedure.

Figure 14A:
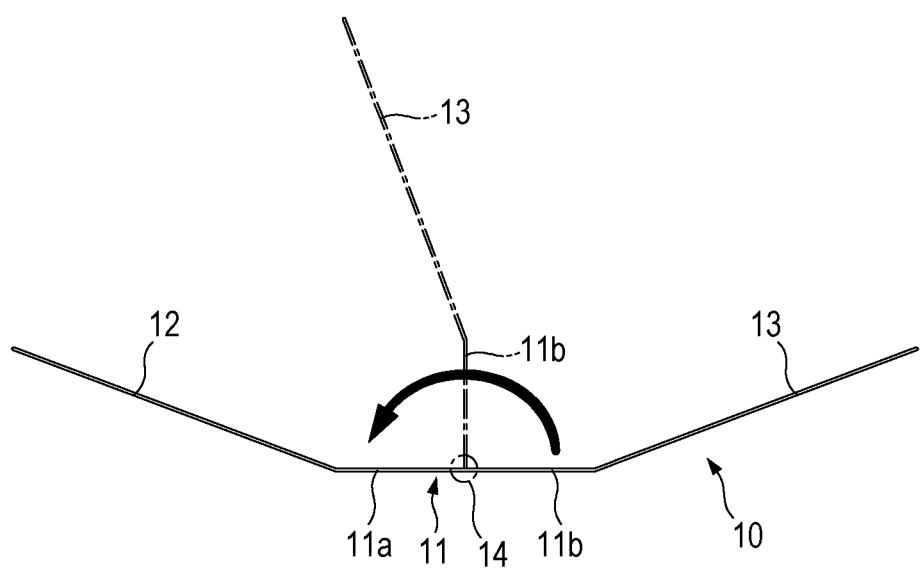
FIG. 14A shows an example of processing a wire material in manufacturing processes of a fishing line threader according to one embodiment of the present disclosure.

Referring to FIG. 14A, first, a wire material 10, which has an intermediate portion 11 and a first linear portion 12 and a second linear portion 13 obliquely extending from the ends of the intermediate portion 11 respectively, may be manufactured. Next, the wire material 10 is folded back with reference to a bisecting position 14 of the intermediate portion 11, thus forming a first intermediate portion 11a and a second intermediate portion 11b in the intermediate portion 11. The wire material 10 can be folded back at the bisecting position 14 where the overall length of the wire material 10 is bisected.

Figure 14B:
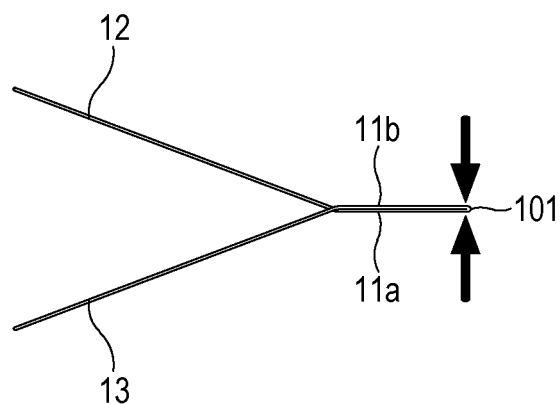
FIG. 14B shows an example of a pressing process in the manufacturing processes of the fishing line threader according to one embodiment of the present disclosure.

Referring to FIG. 14B, a pressing process may be performed on the first intermediate portion 11a and the second intermediate portion 11b so that the first intermediate portion 11a and the second intermediate portion 11b are in close contact with each other. If the pressing process is performed such that there is no gap between the first intermediate portion 11a and the second intermediate portion 11b, the first intermediate portion 11a and second intermediate portion 11b in close contact with each other can form the fishing line pinching portion 110 shown in FIG. 3.

Figure 14C:
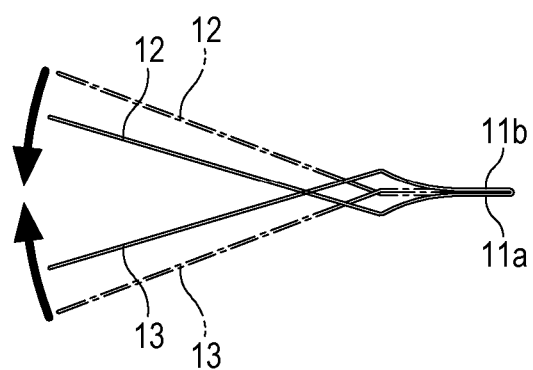
FIG. 14C shows an example of an aligning process in the manufacturing processes of the fishing line threader according to one embodiment of the present disclosure.

Referring to FIG. 14C, the first linear portion 12 and the second linear portion 13 are aligned by pushing an end portion of the first linear portion 12 and an end portion of the second linear portion 13 in an arrow direction shown in FIG. 14C such that the first linear portion 12 located at an upper side is moved toward the second linear portion 13 located at a lower side and the second linear portion 13 located at the lower side is moved toward the first linear portion 12 located at the upper side. During the aforementioned aligning process, a portion of the first intermediate portion 11a adjacent to the first linear portion 12 and a portion of the second intermediate portion 11b adjacent to the second linear portion 13 are spread in an approximately triangular shape. If the aligning process is completed, a portion of the first intermediate portion 11a, a portion of the second intermediate portion 11b, a portion of the first linear portion 12, and a portion of the second linear portion 13 form the elastic portion 120 having a rhombus shape shown in FIG. 3. Further, the remaining portion of the first linear portion 12 and the remaining portion of the second linear portion 13, which are not formed into the elastic portion 120, are brought into contacted with each other by the aligning process, and form the first leading end portion 131 and the second leading end portion 132 constituting the leading end portion 130 shown in FIG. 3.

Figure 14D:
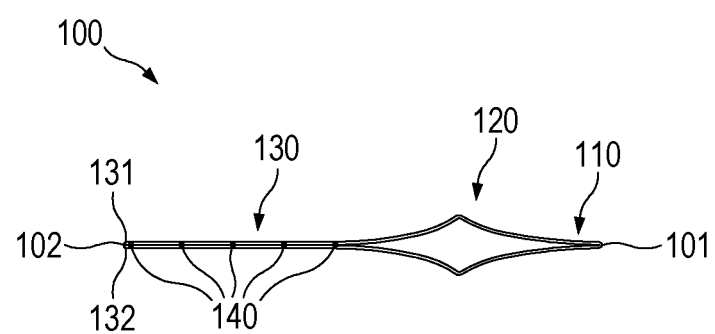
FIG. 14D shows an example of a joining process in the manufacturing processes of the fishing line threader according to one embodiment of the present disclosure.

Referring to FIG. 14D, the first linear portion 12 and the second linear portion 13 may be joined to connect the first linear portion 12 and the second linear portion 13 forming the first leading end portion 131 and the second leading end portion 132, respectively. That is, the surfaces of the first leading end portion 131 and the second leading end portion 132 in contact with each other may be joined. The joining may be performed by spot welding, brazing, or soldering. The number of the joining locations is preferably three to six locally, but is not limited thereto.

Since the manufacturing method shown in FIGS. 14A to 14D has a small number of processes and is economical, the manufacturing method may be a reasonable method for manufacturing the fishing line threader 100 by means of a single metallic wire material so that the elastic portion 120 can have a spring property.

Figure 15A:
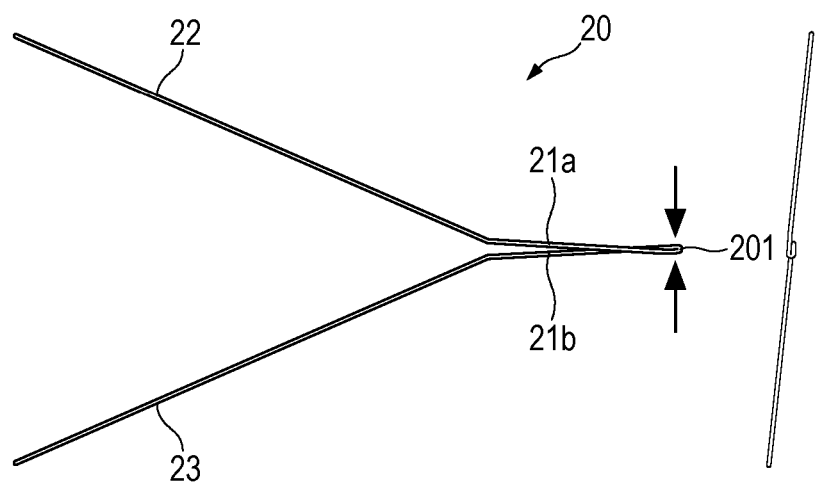
FIG. 15A shows an example of a squeezing process on a wire material in manufacturing processes of the fishing line threader according to another embodiment of the present disclosure.
Figure 15B:
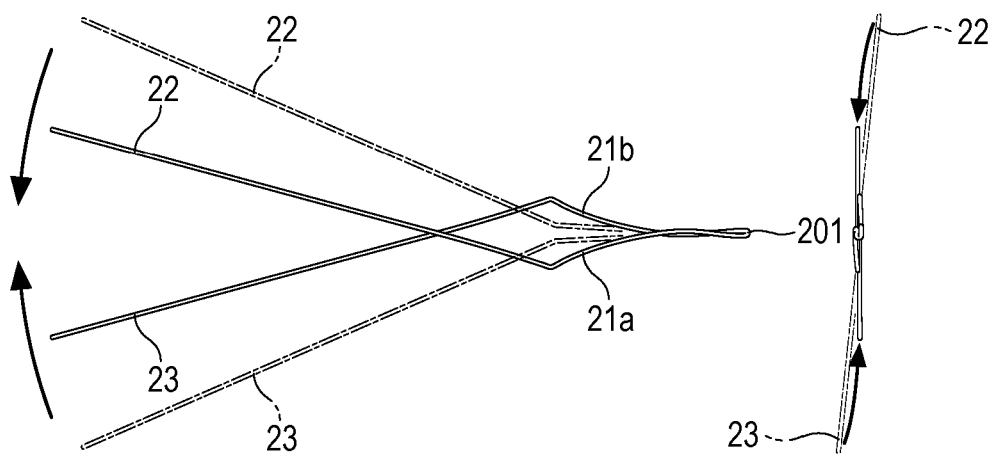
FIG. 15B shows an example of an aligning process in the manufacturing processes of the fishing line threader according to another embodiment of the present disclosure.
Figure 15C:
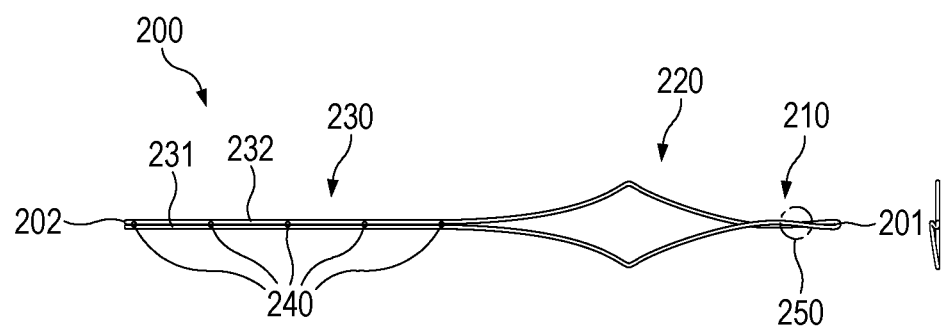
FIG. 15C shows an example of a joining process in the manufacturing processes of the fishing line threader according to another embodiment of the present disclosure.

FIGS. 15A to 15C illustrate manufacturing processes of the fishing line threader 200 according to another embodiment of the present disclosure. The fishing line threader 200 according to another embodiment may be manufactured by the procedures shown in FIGS. 15A to 15C and the manufacturing process shown in each procedure. Further, prior to staring the process shown in FIG. 15A, the same processes as those in FIGS. 14A and 14B are first performed on a wire material 20. Descriptions that are duplicative of the manufacturing processes described with reference to FIGS. 14A and 14B are omitted below.

Figure 13:
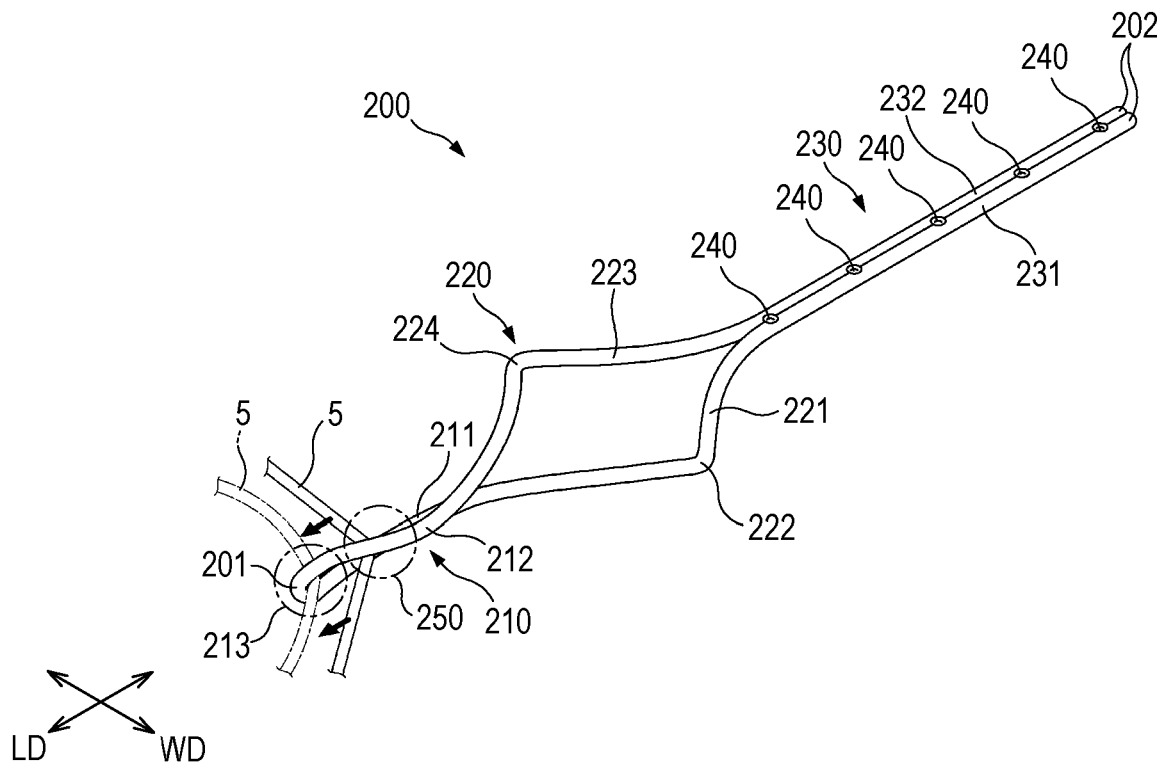
FIG. 13 is a perspective view showing a fishing line threader according to another embodiment of the present disclosure.

Referring to FIG. 15A, in order to form the twisting portion 250 of the fishing line pinching portion shown in FIG. 13, a squeezing process shown by an arrow direction in FIG. 15A is performed on a first intermediate portion 21a and a second intermediate portion 21b such that a portion of the first intermediate portion 21a and a portion of the second intermediate portion 21b cross and make contact with each other and are rubbed and overlapped with each other. The squeezing process described in FIG. 15A may be defined as a process which is performed such that the points where the metallic wire materials are in contact with each other are created at a predetermined position (i.e., the twisting portion shown in FIG. 13) when performing the pressing processing described in FIG. 14B.

Referring to FIG. 15B, the aligning process described with reference to FIG. 14C is performed. A first linear portion 22 and a second linear portion 23 are aligned by pushing an end portion of the first linear portion 22 and an end portion of the second linear portion 23 in an arrow direction shown in FIG. 15B such that the first linear portion 22 located at an upper side is moved toward the second linear portion 23 located at a lower side and the second linear portion 23 located at the lower side is moved toward the first linear portion 22 located at the upper side. During the aforementioned aligning process, a portion of the first intermediate portion 21a adjacent to the first linear portion 22 and a portion of the second intermediate portion 21b adjacent to the second linear portion 23 are spread in an approximately triangular shape. Further, respective end portions of the first linear portion 22 and the second linear portion 23 are aligned while being twisted (see arrow directions shown in the right side of FIG. 15B). Therefore, a portion of the first intermediate portion 21a, a portion of the second intermediate portion 21b, a portion of the first linear portion 22, and a portion of the second linear portion 23 form the elastic portion 220 having a rhombus shape shown in FIG. 13. Further, the remaining portion of the first linear portion 22 and the remaining portion of the second linear portion 23, which are not formed into the elastic portion 220, are brought into contact with each other by the aligning process, and form the first leading end portion 231 and the second leading end portion 232 constituting the leading end portion 230 shown in FIG. 13.

Referring to FIG. 15C, the first linear portion 22 and the second linear portion 23 may be locally joined to connect the first linear portion 22 and the second linear portion 23 forming the first leading end portion 231 and the second leading end portion 232, respectively. That is, the first leading end portion 231 and the second leading end portion 232 may be locally joined to connect the first leading end portion 231 and the second leading end portion 232.

Since the twisting portion 250 becomes a portion where metallic wire materials rub against and overlap with each other, an angler can insert the fishing line 5 into the fishing line pinching portion 210 at such a position. As described above, if the twisting portion 250 is formed in such a manner that the metallic wire materials rub against and overlap with each other, a defect where a gap is generated between the metallic wire materials of the fishing line pinching portion 210 due to the spring back phenomenon after the pressing process can be reduced, and productivity can be improved.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the appended claims.

What is claimed is:

1. A fishing line threader for passing a fishing line through guide rings of a plurality of fishing line guides installed successively in a fishing rod,
   wherein the fishing line threader is composed of only a single metallic wire material and has a shape extending along a longitudinal direction as a whole,
   wherein the fishing line threader comprises:
   a fishing line pinching portion having a first pinching portion and a second pinching portion which connect with each other at a first end portion, the first pinching portion and the second pinching portion being in contact with each other at least partially and forming an annular shape so as to fit and support the fishing line therebetween;
   an elastic portion having a first elastic portion extending from the first pinching portion and a second elastic portion extending from the second pinching portion, the elastic portion forming a rhombus shape as a whole such that the first elastic portion and the second elastic portion have vertex which are at positions maximally spaced apart in a width direction perpendicular to the longitudinal direction, respectively; and
   a leading end portion including a first leading end portion and a second leading end portion which extend respectively from the first and second elastic portions to a second end portion in the longitudinal direction and are disposed adjacent to each other,
   wherein both ends of the single metallic wire material are put together at the leading end portion and form the second end portion,
   wherein the first and second leading end portions of the leading end portion are joined to each other by a joining portion,
   wherein the joining portion is a plurality of joining portions arranged locally along the leading end portion, and
   wherein the joining portion is formed so as not to form a step protruding from a surface of the leading end portion and is formed by spot welding, brazing, or soldering.

2. The fishing line threader of claim 1, wherein a length along the longitudinal direction from the vertex portion to the second end portion is 60% to 80% of an overall length between the first end portion and the second end portion.

3. The fishing line threader of claim 1, wherein an overall length along the longitudinal direction between the first end portion and the second end portion is determined within a range of 75 mm to 115 mm so as to correspond to spacing of three fishing line guides that are installed successively.

4. The fishing line threader of claim 1, wherein the fishing line pinching portion includes a twisting portion which is formed by crossing and overlapping at least a portion of the first pinching portion and at least a portion of the second pinching portion.

* * * * *